United States Patent
Moughton et al.

(10) Patent No.: US 9,494,311 B2
(45) Date of Patent: Nov. 15, 2016

(54) FLOW HEATERS

(75) Inventors: Colin Peter Moughton, Port St. Mary (GB); Alan Campbell Owen, Castletown (GB); Jonathan Michael White, Laxey (GB)

(73) Assignee: Strix Limited, Ronaldsway (IM)

( * ) Notice: Subject to any disclaimer, the term of this patent is extended or adjusted under 35 U.S.C. 154(b) by 313 days.

(21) Appl. No.: 14/239,444

(22) PCT Filed: Aug. 15, 2012

(86) PCT No.: PCT/GB2012/051986
§ 371 (c)(1),
(2), (4) Date: Apr. 9, 2014

(87) PCT Pub. No.: WO2013/024286
PCT Pub. Date: Feb. 21, 2013

(65) Prior Publication Data
US 2014/0233928 A1     Aug. 21, 2014

(30) Foreign Application Priority Data
Aug. 15, 2011   (GB) ................................. 1113982.1

(51) Int. Cl.
| F24H 1/10 | (2006.01) |
| H05B 1/02 | (2006.01) |
| F22B 1/28 | (2006.01) |
| F24H 1/14 | (2006.01) |
| F24H 9/18 | (2006.01) |
| F24H 9/20 | (2006.01) |
| A47J 31/54 | (2006.01) |
| A47J 27/21 | (2006.01) |

(52) U.S. Cl.
CPC .......... *F22B 1/282* (2013.01); *A47J 27/21066* (2013.01); *A47J 27/21108* (2013.01); *A47J 27/21125* (2013.01); *A47J 31/545* (2013.01); *F24H 1/103* (2013.01); *F24H 1/142* (2013.01); *F24H 9/1818* (2013.01); *F24H 9/2028* (2013.01)

(58) Field of Classification Search
None
See application file for complete search history.

(56) References Cited

U.S. PATENT DOCUMENTS

| 4,185,187 A | * | 1/1980 | Rogers | F24H 9/2014 219/496 |
| 4,356,381 A | * | 10/1982 | Flaherty, Jr. | A47J 31/545 219/526 |
| 4,501,952 A | * | 2/1985 | Lehrke | B05B 7/22 165/156 |
| 4,508,957 A | * | 4/1985 | Rocchitelli | B60S 1/481 137/341 |
| 4,855,569 A | * | 8/1989 | Wiedemann | F24H 1/225 392/461 |
| 4,990,745 A | * | 2/1991 | Bayles | B44C 7/027 392/386 |

(Continued)

FOREIGN PATENT DOCUMENTS

| DE | 3306807 | 8/1984 |
| DE | 19854639 | 5/2000 |

(Continued)

*Primary Examiner* — Thor Campbell
(74) *Attorney, Agent, or Firm* — O'Shea Getz P.C.

(57) ABSTRACT

A flow heater is provided including a heating element, a channel heated by said heating element for heating liquid flowing therethrough, and temperature sensing means in thermal communication with both the heating element and the channel so as to be sensitive to the temperature of the liquid in the channel and the temperature of the heating element.

14 Claims, 7 Drawing Sheets

(56) References Cited

U.S. PATENT DOCUMENTS

| | | | | |
|---|---|---|---|---|
| 5,271,086 A * | 12/1993 | Kamiyama | ............ | F24H 1/142 137/341 |
| 5,371,830 A * | 12/1994 | Wachenheim | ....... | H05B 3/0052 392/487 |
| 5,408,578 A * | 4/1995 | Bolivar | .................. | F24H 1/102 219/481 |
| 5,724,478 A * | 3/1998 | Thweatt | ................. | F24H 1/142 219/535 |
| 5,740,315 A * | 4/1998 | Onishi | .................... | F24H 1/121 392/483 |
| 5,872,890 A * | 2/1999 | LaCombe | ....... | F24H 1/102 392/487 |
| 6,205,292 B1 * | 3/2001 | Pokorny | ................. | F24H 1/142 392/465 |
| 6,928,237 B2 * | 8/2005 | Matsunaga | .......... | B60H 1/2221 392/480 |
| 7,206,506 B2 * | 4/2007 | Sturm | .................. | F24H 9/2028 392/478 |
| 7,565,065 B2 * | 7/2009 | Kato | ...................... | F24H 1/142 392/311 |
| 7,593,789 B2 * | 9/2009 | Gougerot | ............. | A61H 33/005 219/412 |
| 7,801,424 B2 * | 9/2010 | Cheung | ................ | A61H 33/063 392/385 |
| 7,822,326 B2 * | 10/2010 | Commette | ............. | F24H 1/102 392/465 |
| 8,112,164 B2 * | 2/2012 | Hollaway | ............ | A61H 33/005 700/28 |
| 8,238,733 B2 * | 8/2012 | Sawada | ................ | F16L 53/008 138/33 |
| 9,074,819 B2 * | 7/2015 | Tiras | ....................... | F27D 11/02 |
| 2003/0188539 A1 * | 10/2003 | Abras | ..................... | F24H 1/162 62/3.3 |
| 2005/0019028 A1 * | 1/2005 | Kuebler | ................ | F24H 9/2028 392/484 |
| 2006/0236999 A1 | 10/2006 | Pleschinger et al. | | |
| 2008/0212954 A1 * | 9/2008 | Sachtleben | ....... | A47J 27/21041 392/479 |

FOREIGN PATENT DOCUMENTS

| | | |
|---|---|---|
| JP | S6053738 | 3/1985 |
| JP | H08271038 | 4/1996 |
| WO | 2004034742 | 4/2004 |

* cited by examiner

FLOW HEATERS

This application is entitled to the benefit of, and incorporates by reference essential subject matter disclosed in PCT Application No. PCT/GB2012/051986 filed on Aug. 15, 2012, which claims priority to GB1113982.1 filed Aug. 15, 2011.

BACKGROUND OF THE INVENTION

1. Technical Field

This invention relates to flow heaters for heating liquids, e.g. water.

2. Background Information

One form of conventional flow heater comprises a channel having a heating element on its outside, which allows overheat protection for the heating element to be provided in close thermal contact with the element, so that the element can be switched off quickly and effectively in the event of it being energized without water in the channel to prevent it from overheating.

However, such high power flow heaters are prone to limescale build up in the relatively narrow channel, which can both restrict the flow of water and insulate the heating element. As will be appreciated this insulation of the heating element and restriction of the water flow causes the heating element to operate at an increasingly higher temperature during normal use which will eventually lead to the overheat protection operating to disconnect the heater even when water is flowing through the channel. This is known in the art as "Dry Boil Interference" (DBI). When such a situation is reached it is not possible to operate the flow heater as the overheat protection will switch off the element before the required volume of water has been heated. Furthermore, it is not possible to design around this situation, e.g. by increasing the temperature at which the overheat protection operates, as this would raise the threshold temperature to a dangerously high value, i.e. one at which genuine overheat (e.g. with little or no water in the flow heater) is not detected quickly enough resulting in permanent damage to the appliance and/or a risk of fire. Such heaters may therefore require regular de-scaling, especially in hard water areas.

It is an object of the invention to provide a flow heater with an improved overheat protection arrangement.

SUMMARY OF THE DISCLOSURE

When viewed from a first aspect the present invention provides a flow heater comprising a heating element, a channel heated by said heating element for heating liquid flowing therethrough, and temperature sensing means in thermal communication with both the heating element and the channel so as to be sensitive to the temperature of the liquid in the channel and the temperature of the heating element.

By providing temperature sensing means in thermal communication with both the heating element and the liquid channel, there is a reduced tendency for DBI as a result of the build up of scale in the channel since when there is liquid in the channel this will act to limit the temperature experienced by the temperature sensing means. However this does not affect the level of overheat protection since when there is no liquid in the channel, the element will rise in temperature rapidly which will still be detected by the temperature sensing means. The temperature sensing means effectively experiences an average of the temperatures of the element and liquid respectively (although not necessarily with equal contributions). This means that compared to conventional designs, a greater amount of scale can be allowed to build up in the channel before DBI occurs.

This contrasts to conventional liquid heating systems in which the boil dry sensor is located in thermal contact solely with the heating element, and so is not sensitive to the temperature of the liquid in the channel. As explained above this gives DBI because when timescale insulates the heating element from the liquid, the element runs hotter for the same liquid temperature.

Furthermore, in the arrangement of the present invention, the absence of liquid in the channel is still detected quickly as in this situation the heating element and liquid channel will quickly heat up above the threshold temperature of the temperature sensing means. Thus the invention provides a balance between achieving a large number of cycles before DBI occurs while still achieving a quick switch-off time in a genuine overheat condition, e.g. if the appliance is turned on without any liquid in it, known in the art as "Dry Switch-On" (DSO), or if some other fault arises.

Typically the temperature sensing means will be arranged to remove or reduce power to the heating element when the temperature sensing means detects a predetermined temperature condition, so that the heating element does not keep overheating and damages itself or other components of the flow heater. The predetermined temperature condition could simply be a threshold temperature or, for example, it could be a particular rate of change of temperature.

There are many ways in which the temperature sensing means could be arranged in thermal communication with both the heating element and the liquid flow channel. In a set of embodiments the temperature sensing means is mounted directly onto the heating element and the channel. Alternatively the temperature sensing means could be mounted on a bezel or a diffuser, e.g. made from aluminum, which in turn is mounted directly onto the heating element and the channel. Providing an intermediate component between the heating element and channel, and the temperature sensing means, helps to deliver a more even temperature distribution to the temperature sensing means. It could also be envisaged that a diffuser or a bezel could be used to mount only part of the temperature sensing means, e.g. that which is in contact with the heating element, with the remaining part of the temperature sensing means mounted directly onto the channel (or vice versa), in order to tune the response of the temperature sensing means to the temperature of the heating element and the liquid in the channel. The temperature sensing means could be provided inside the channel, e.g. within the liquid flow or on an inside wall, but preferably the temperature sensing means is arranged on the outside of the channel and/or heating element, e.g. on an outer wall of the channel.

In a set of embodiments the heating element and the channel comprise a contact area bridging the heating element and the channel, e.g. on the outside of the channel and/or heating element, and with which the temperature sensing means is in thermal communication. Providing such a contact area helps to increase the area over which the temperature sensing means is in thermal communication, enabling a more accurate measurement of the temperature to be made. In these embodiments the contact area could provide a mounting location for the temperature sensing means directly, or the bezel or diffuser as discussed above. The contact area could comprise a recess in or a flattened surface area on the heating element and the channel.

The temperature sensing means could comprise one of a number of different components or devices, which could be thermo-mechanical or electrical, for example a bimetallic disc thermostat, e.g. a half-inch disc, a bimetallic actuator, a thermal fuse, or a thermistor. As a thermistor is generally able to detect a continuous range of temperatures, this could be used in the set of embodiments in which the predetermined temperature condition comprises a rate of change of temperature. Additionally, a thermistor could be used to provide an indicator for when the liquid flow channel needs descaling. This indicator would have a different predetermined temperature condition to the temperature sensing means, e.g. a lower temperature threshold after a certain period of operation.

In a set of embodiments the heating element is mounted to or in contact with a wall of the channel, e.g. the outer wall of the channel in a subset of embodiments. This allows effective heat transfer between the heating element and the liquid in the channel. In a set of embodiments the channel and/or the heating element comprises a flat or complementary shaped portion on the respective walls to allow mounting or contact. The heating element could take the form of a so-called thick film printed element. Such elements are conventionally planar, but can also be produced with non-planar substrates. However, in a preferred set of embodiments the heating element comprises a sheathed resistance heating element, e.g. brazed to the channel. The flow heater could additionally comprise an intermediate metallic heat diffuser plate between the sheathed resistance heating element and the channel, e.g. as is commonly found in so-called underfloor heaters for domestic kettles. Typically the power of the heating element is greater than 1 kW, e.g. greater than 2 kW, e.g. 3 kW. This allows the liquid to be heated quickly in a relatively small flow heater, e.g. one having a short channel.

In some embodiments the channel and the heating element could be substantially straight, which is simple to manufacture. In another set of embodiments the channel and the heating element could comprise at least a portion which is curved. This allows the flow heater to fit into a smaller space and therefore provide a more compact appliance.

In one set of embodiments the flow heater comprises a single heating element and a single channel, however other embodiments are envisaged. For example, the flow heater could comprise two or more heating elements arranged on different sides of the channel Providing at least two heating elements on different, e.g. opposite, sides of the channel increases the overall heating power of the flow heater allowing liquid to be heated faster. This could allow the channel length to be shortened, enabling a smaller flow heater to be provided.

In another set of embodiments the channel comprises a first portion in fluid communication with a second portion, each portion arranged to be heated by said heating element for heating liquid flowing therethrough, wherein the first and second portions are arranged on different sides of the heating element. This is considered to be novel and inventive in its own right and therefore when viewed from a further aspect the invention provides a flow heater comprising a heating element and a first channel in fluid communication with a second channel, each channel arranged to be heated by said heating element for heating liquid flowing therethrough, wherein the first and second channels are arranged on different sides of the heating element.

Providing channels on different, e.g. opposite, sides of the heating element reduces the mass of the flow heater as the total length of heating element needed is approximately halved, and correspondingly the relative surface area of the heating element which is used for heating is approximately doubled, resulting in a far more efficient flow heater. Reducing the mass of the flow heater has a number of benefits including reducing the thermal mass of the system, reducing the cost of the flow heater as a smaller element is needed, reducing the start up time of the flow heater as the thermal mass is smaller, and/or reducing the operating temperature of the flow heater. Alternatively, a much smaller heating element can be provided, but run at the same operating temperature, and therefore a more compact appliance can be provided.

There is a further advantage, when coupled with the first aspect of the present invention, in that the liquid in the first channel or portion of channel is generally cooler than the liquid in the second channel or portion of channel, and therefore first channel or portion of channel scales up more slowly. After repeated operation of the flow heater the first channel or portion of channel remains relatively free of limescale and therefore its operating temperature over many cycles of operation remains relatively constant, whereas the second channel or portion of channel could have a large build up of limescale resulting in its operating temperature increasing with each cycle of operation owing to the increasing insulation of the heating element from the liquid. However, by arranging the temperature sensing means to be sensitive to the temperature of the liquid in the channel as well as the heating element, the consistently cooler temperature of the liquid in the first channel or portion of channel provides good protection against DBI.

The channels on different sides of the heating element could be provided as a continuous loop or spiral, e.g. with the first channel or portion being an extension of the second channel or portion. In one set of embodiments the first channel or portion is fluidly connected to the second channel or portion—either by an integral loop or via a connecting member, e.g. a plastic loop clamped to the channels. The channels could be provided on adjacent sides of the heating element, e.g. a triangular or square element could be provided with channels on two or more sides of the heating element. However, in a preferred set of embodiments the first and second channels or portions of channel are arranged on opposite sides of the heating element. In all of these embodiments, the heating element and/or the channels could comprise flat or complementary shaped portions on their respective walls to allow mounting or contact of the channels to the heating element.

In the set of embodiments in which first and second channels or portions of channel are provided, the temperature sensing means could be arranged in thermal communication with just one of the channels and the heating element, i.e. not in thermal communication with the other channel. This embodiment could be more suitable if, for example, the wall of the heating element and/or the channel was at a particular angle which did not allow for the temperature sensing means to be located on both the channels and the heating element. As has been explained above, in a set of embodiments the temperature sensing means is preferably chosen to be in thermal communication with the first channel or portion of channel (rather than the second channel or portion) and the heating element, as this keeps a relatively constant operating temperature over many cycles of operation. However, in another set of embodiments the temperature sensing means is in thermal communication with each of the heating element and the first and second channels or portions of channel, the temperature sensing means being sensitive to the temperature of the liquid in both channels or portions of channel and the temperature of the heating element. Providing the temperature sensing means in thermal communication with both the channels and the heating element gives greater cooling from the liquid in the two channels. As in the embodiments discussed above for a single channel, the same features concerning the mounting or placement of the temperature sensing means on the flow heater apply, e.g. both the channels and the heating element could comprise a contact area on which to mount the temperature sensing means.

Likewise, in the set of embodiments in which multiple sections of heating elements are provided, the temperature sensing means could be arranged in thermal communication with one or more of the heating elements and the channel.

In one set of embodiments the channel is arranged to heat liquid flowing therethrough to a first temperature and the flow heater further comprises a final heating region, e.g. a heating chamber, for heating said liquid therein to a second temperature higher than said first temperature and having means for permitting the exit of steam therefrom separately from heated liquid. Providing a heating region which allows steam to exit separately from the heated liquid allows the liquid to be heated to a subsequent higher second temperature which is greater than is possible with a conventional flow heater. Preferably the second temperature is boiling. It is not possible to effectively use a conventional flow heater to heat liquid to boiling because liquid in the boundary layer in a channel will often boil, creating bubbles of steam leading to hot spots in the channel which can lead to failure of the element and spitting of the liquid out of the end of the channel. In fact the hotter the liquid temperature aimed for, the greater these problems are. In practice therefore, flow heaters have been restricted to applications requiring liquid at temperatures below boiling such as shower heaters, and hot water dispensers that do not boil water. In the set of embodiments in which a heating chamber is provided, the means for permitting the exit of steam therefore separately from heated liquid could comprise a space above the liquid surface for allowing the escape of steam from the liquid surface.

In accordance with these embodiments, the final heating region continues to heat the water from the temperature at which it leaves the channel, to a second higher temperature, e.g. boiling. A separate heater could be provided for this purpose. In a set of preferred embodiments however a single heater is provided which extends into the final heating region.

The Applicant has appreciated that providing a heating chamber to heat the water to a higher temperature, i.e. boiling, using a single heater which extends into the heating chamber, can lead to problems when sensing overheating of the heating element, e.g. owing to the absence of water in the channel and/or the heating chamber. This is because the portion of the heating element in the heating chamber, which is typically exposed, can have significantly less thermal mass in thermal communication with it than the portion of the heating element associated with the channel, which can have one or more channels bonded to it. Therefore the portion of the heating element in the heating chamber heats up significantly faster than the remaining portion of the heating element. This can lead to premature failure of the element before the overheat protection acts, e.g. to reduce or remove power from the heating element.

However, the Applicant has devised a solution to this problem. In a set of embodiments the region of the heating element which extends into the final heating region, e.g. a heating chamber, is in thermal communication with a heat sink. This is considered to be novel and inventive in its own right and therefore when viewed from a further aspect the invention provides a flow heater comprising a heating element, a channel heated by a first region of said heating element for heating liquid flowing therethrough to a first temperature, a heating chamber for heating said liquid therein to a second temperature higher than said first temperature, wherein the heating element comprises a second region which extends into the heating chamber and is in thermal communication with a heat sink.

It will thus be appreciated that a heat sink in thermal communication with the second region of the heating element provides an additional mass needed to balance the mass of the channel associated with the first region of the heating element. The heat sink slows the rate at which the first region of the heating element heats up, preventing damage occurring to the element before DSO. The mass of the heat sink does not need to be large, as generally the majority of the heating element will be associated with the channel, i.e. typically the first region of the heating element is larger than the second region, and so the overall mass of the flow heater is still relatively low (typically about 100 g) for a high power (e.g. 1.2 kW) heating element. This maintains the fast start up time of the flow heater while protecting the element against overheating and being able to dispense hot, e.g. boiling, liquid. The heat sink could comprise any suitable additional thermal mass, but in a set of embodiments the heat sink comprises a block of metal, e.g. an aluminum slug, bonded to the heating element, e.g. a sheathed heating element.

There are many possible arrangements for how the heated liquid flows out from the final heating region in accordance with the invention. One possibility would be a simple valve or tap for allowing water to drain out of the region. The problem with such an arrangement is that the outflow through such a valve or tap would have to be precisely coordinated with the inflow (e.g. from a pump). For example, if the outflow rate is even slightly greater than the inlet flow rate, (or if it commences to flow out too early) the heater will run dry. If the outflow rate is slightly lower, then the outflow region will overflow, or, as the water level increases, the effect of boiling in the chamber will result in water spitting. This will occur because, as the steam bubbles generated at the surface now must travel through a vertical body of water, they will entrain droplets of water and carry them at high velocity to the surface. The pump inflow may start and stop at irregular times, and/or be constantly varying in response to all the input variables—desired outlet temperature, inlet water temperature, voltage fluctuations, and the natural oscillations that can occur in any closed loop control system. The difficulty in controlling the outflow is further exacerbated by the need, on start-up, to prevent outflow until such time as sufficient water has entered to fill the system to its intended working level.

In a set of preferred embodiments therefore means are provided to permit automatic outflow of liquid from the final heating region upon the liquid reaching a predetermined level. This ensures that a certain amount of liquid is retained and can therefore ensure that a heater surface is covered sufficiently to prevent it overheating. Such a function could be achieved electronically or through use of a float but preferably a weir is provided such that liquid escapes over the weir and out of the final heating region when the water level in the chamber exceeds a predetermined height (determined by the height of the weir).

The Applicant has further appreciated that this arrangement allows even a relatively large heater surface to remain covered with a relatively thin covering of liquid and so avoid overheating. In one set of embodiments the final heating region comprises a drainage outlet arranged to drain undispensed liquid out of the final heating region. This prevents any undispensed liquid from remaining in the final heating chamber where it would cool and therefore adversely affect the temperature of the liquid dispensed the next time. Furthermore, providing a drainage outlet allows for overheating of the element in the event of the element being energized with no liquid in the flow heater to be sensed quickly, as there will be no remaining water in the final heating region that may increase the thermal mass of the system and therefore potentially increase the time until the element is switched off. In one set of embodiments the drainage outlet comprises a slit or hole in the weir, e.g. arranged so that during normal flow rate of the heater the weir causes liquid to fill up the final heating region until it spills over the top of the weir, but allows the liquid to drain out of the final heating region once the flow of liquid into the final heating region ceases.

BRIEF DESCRIPTION OF THE DRAWINGS

Certain preferred embodiments of the invention will now be described, by way of example only, with reference to the accompanying drawings in which.

DETAILED DESCRIPTION OF THE INVENTION

Figure 1:
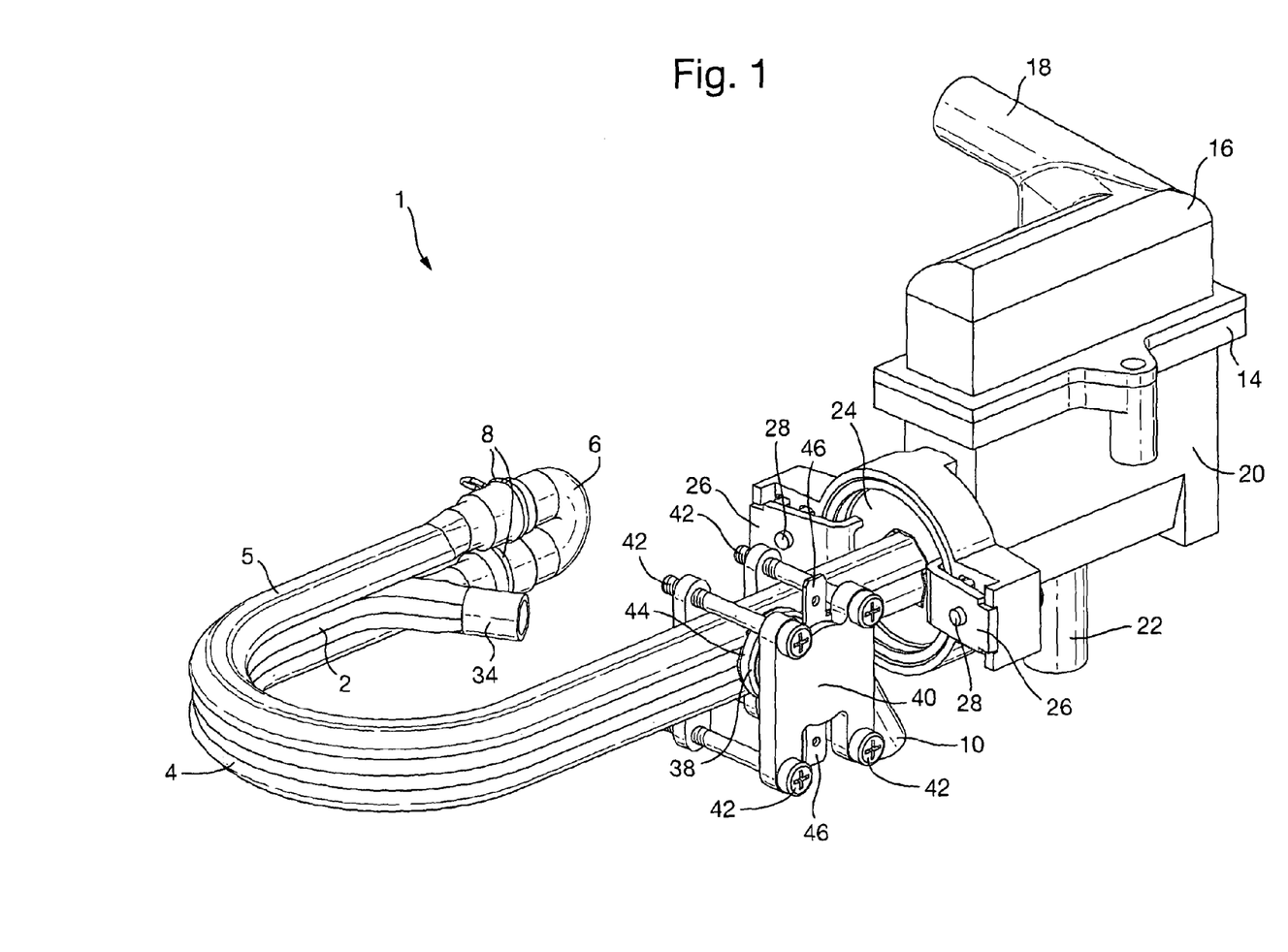
FIGS. 1 and 2 show isometric views from two sides of a flow heater in accordance with the present invention.
Figure 2:
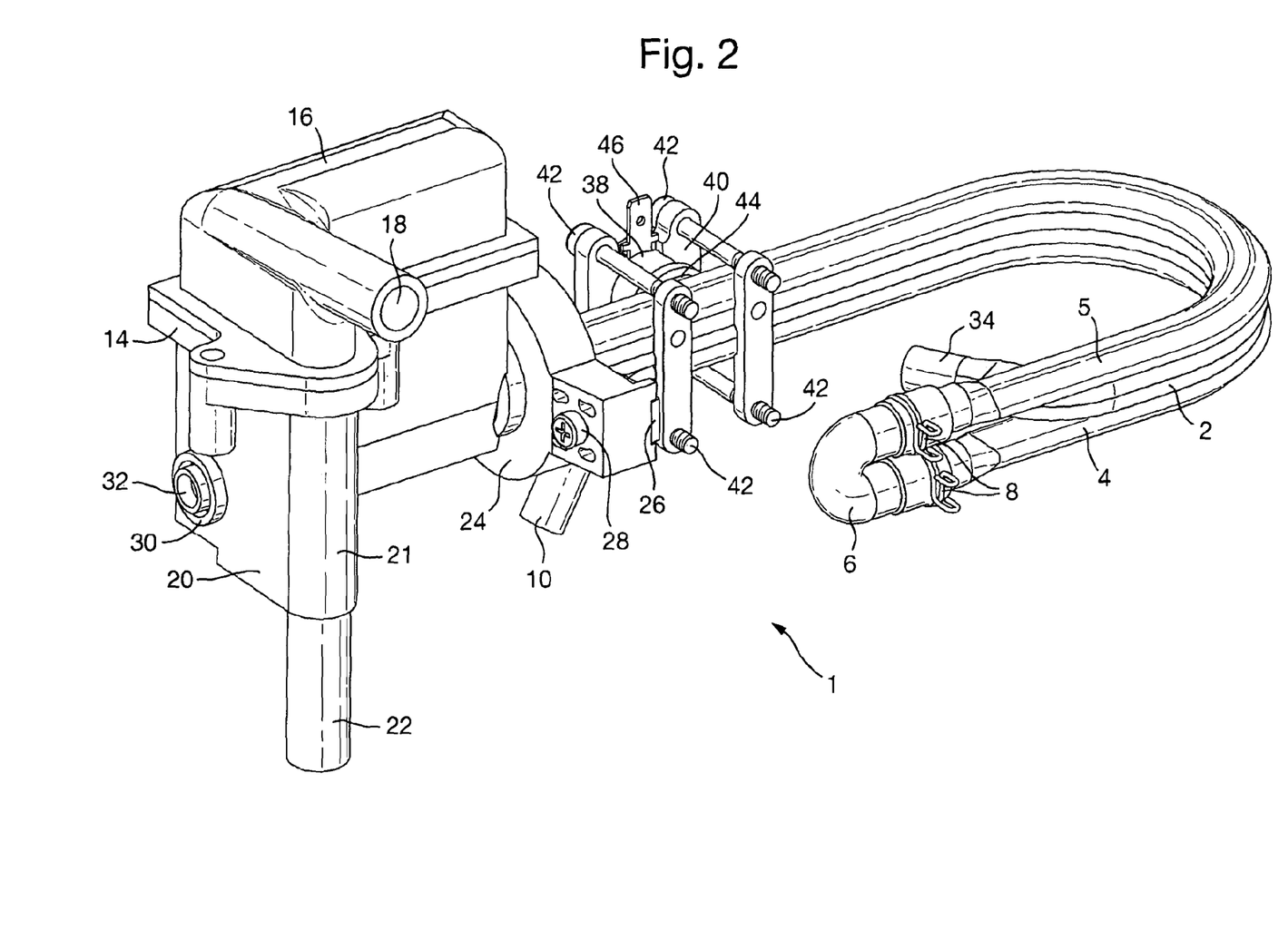

FIGS. 1 and 2 show a flow heater 1 in accordance with the invention which can be used to heat water to boiling, e.g. for use in a hot drinks dispenser. The flow heater comprises a length of a sheathed immersion-type heating element 2 which, although not depicted, comprises an aluminum casing and a coiled resistance wire packed in magnesium oxide insulating powder. Arranged on and brazed to opposite sides of the heating element 2 are two aluminum water flow channels 4, 5. At one end of the heating element 2, two adjacent ends of the channels 4, 5 are connected together by means of a plastic tube 6 which is sealed onto the channels 4, 5 by clamps 8 at each end. This creates a flow path for water through the flow heater from an inlet 10 to an outlet 12 (see FIGS. 3, 4 and 5) into a heating chamber 14. The heating element 2 and the water flow channels 4, 5 conform closely to one another and are arranged in a J-shape (seen more clearly in FIG. 5), which allows a compact flow heater to be provided for fitting into a small appliance, e.g. a kitchen coffee maker.

Figure 3:
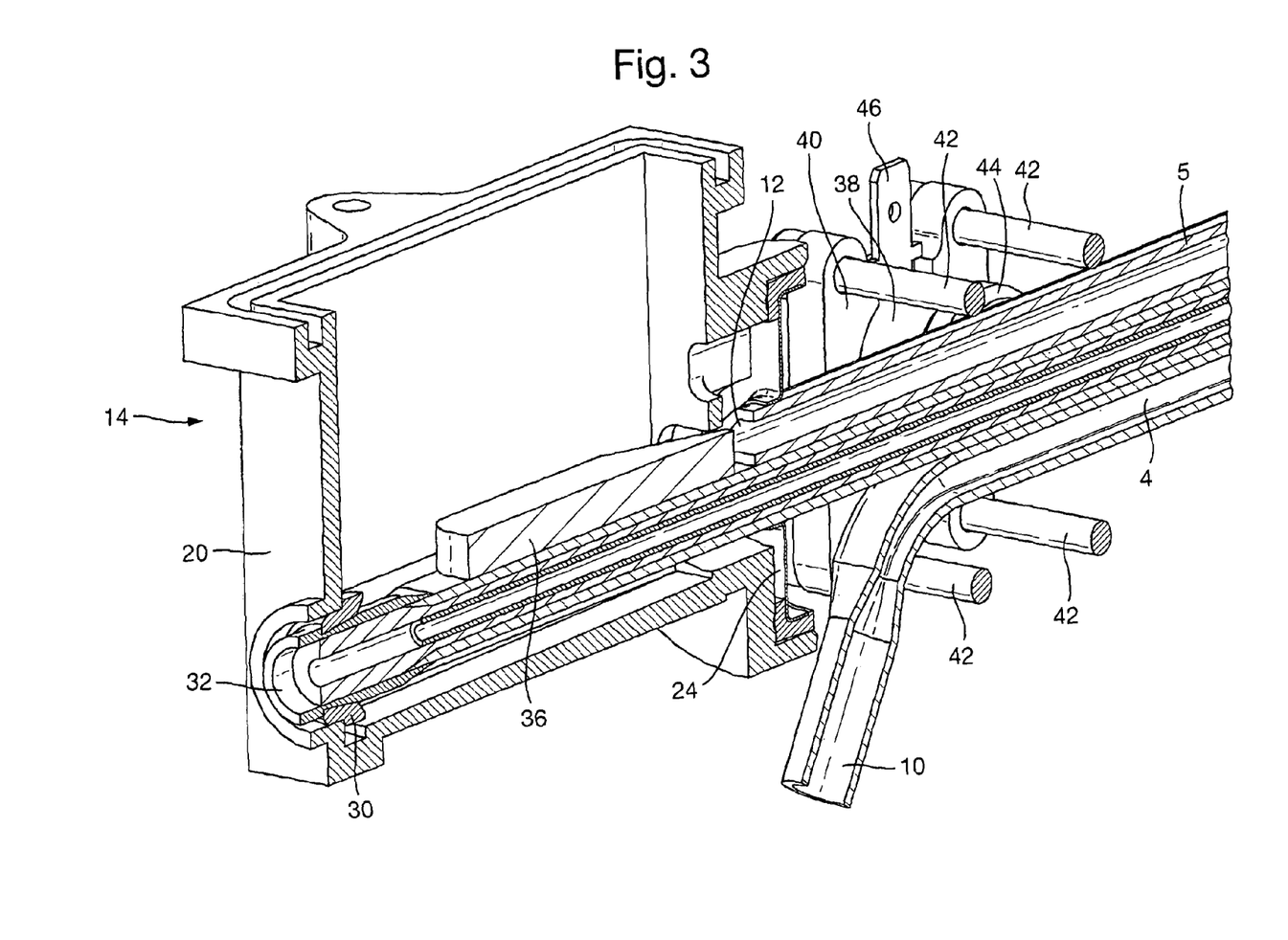
FIGS. 3 and 4 show cross-sectional views through the heating chamber of the flow heater shown in FIGS. 1 and 2.
Figure 4:
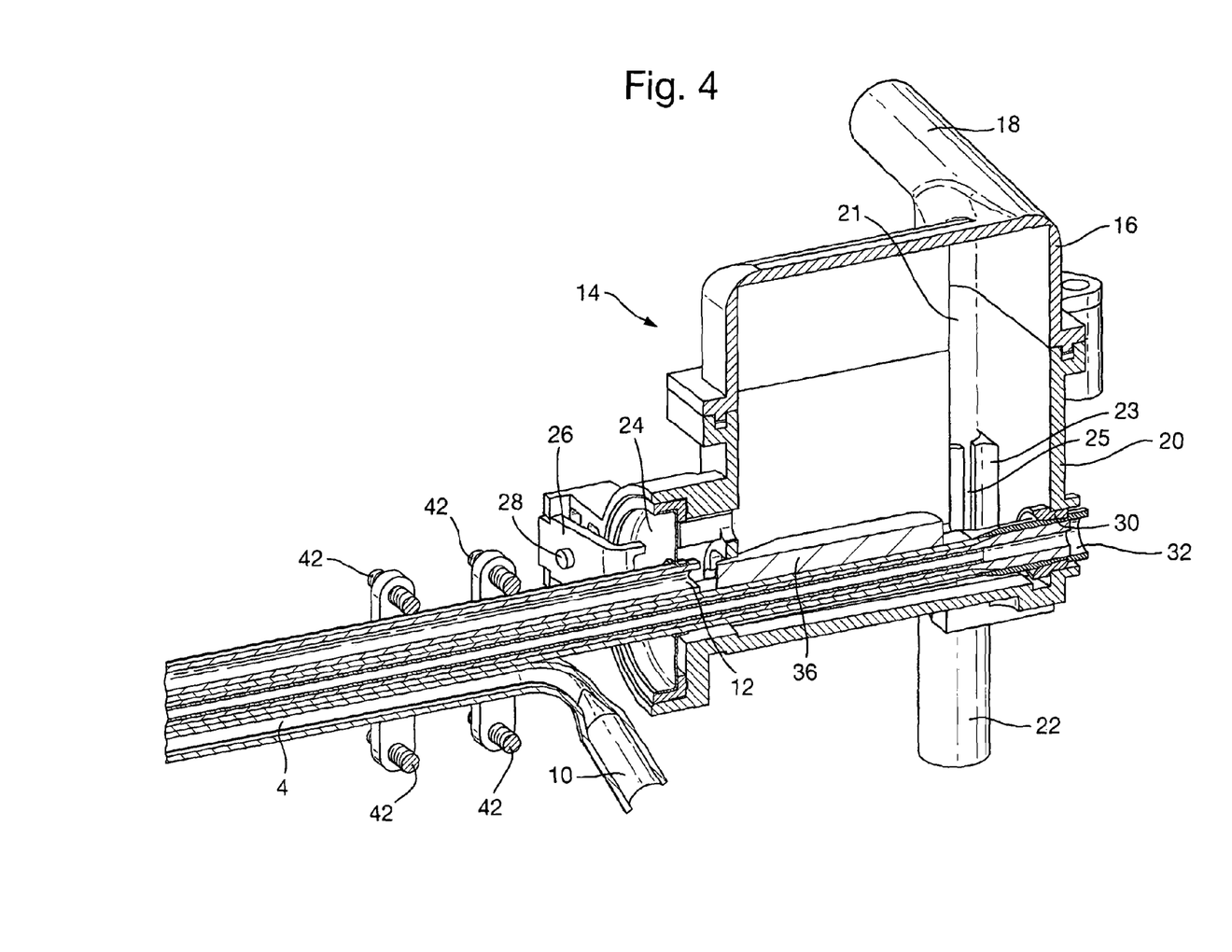

The heating chamber 14, shown also in FIGS. 3 and 4, comprises a lid 16 with a steam outlet 18 (omitted in FIG. 3 for clarity), and a main body 20 into which the heating element 2 extends. The steam outlet 18 allows steam to be vented to atmosphere away from the user or to be captured and condensed in a suitable trap, drip tray or the like. The main body 20 of the heating chamber 14 has an overall elongate rectangular shape in which the portion of the heating element 2 inside it occupies the lower portion, although water can pass all the way around it. A sideways extension 21 houses a hot water outlet 22 in its base at the downstream end of the heating chamber 14. The hot water outlet 22 extends vertically up into the main body 20 of the heating chamber 14 just above the height, but offset to the side, of the heating element 2 to form a weir 23. A narrow slit 25 in the weir 23 allows any remaining water in the heating chamber 14 following operation to be drained away.

A sealing flange 24, held in place by a clamp 26 and screws 28, provides a sealed entry for the heating element 2 and the upper channel 5 which project into the main body 20 of the heating chamber 14. The upper channel 5 terminates just inside the heating chamber 14, while the heating element 2 extends across the heating chamber 14 to project through the other side of the main body 20 where it is sealed by a ring seal 30 around its cold tail 32. The cold tail 34 at the other end of the heating element 2 is arranged to project clear of the channels 4, 5 near to the plastic connecting tube 6. This permits electrical connection to be made to the cold tails 32, 34 at both ends of the heating element 2.

Figure 5:
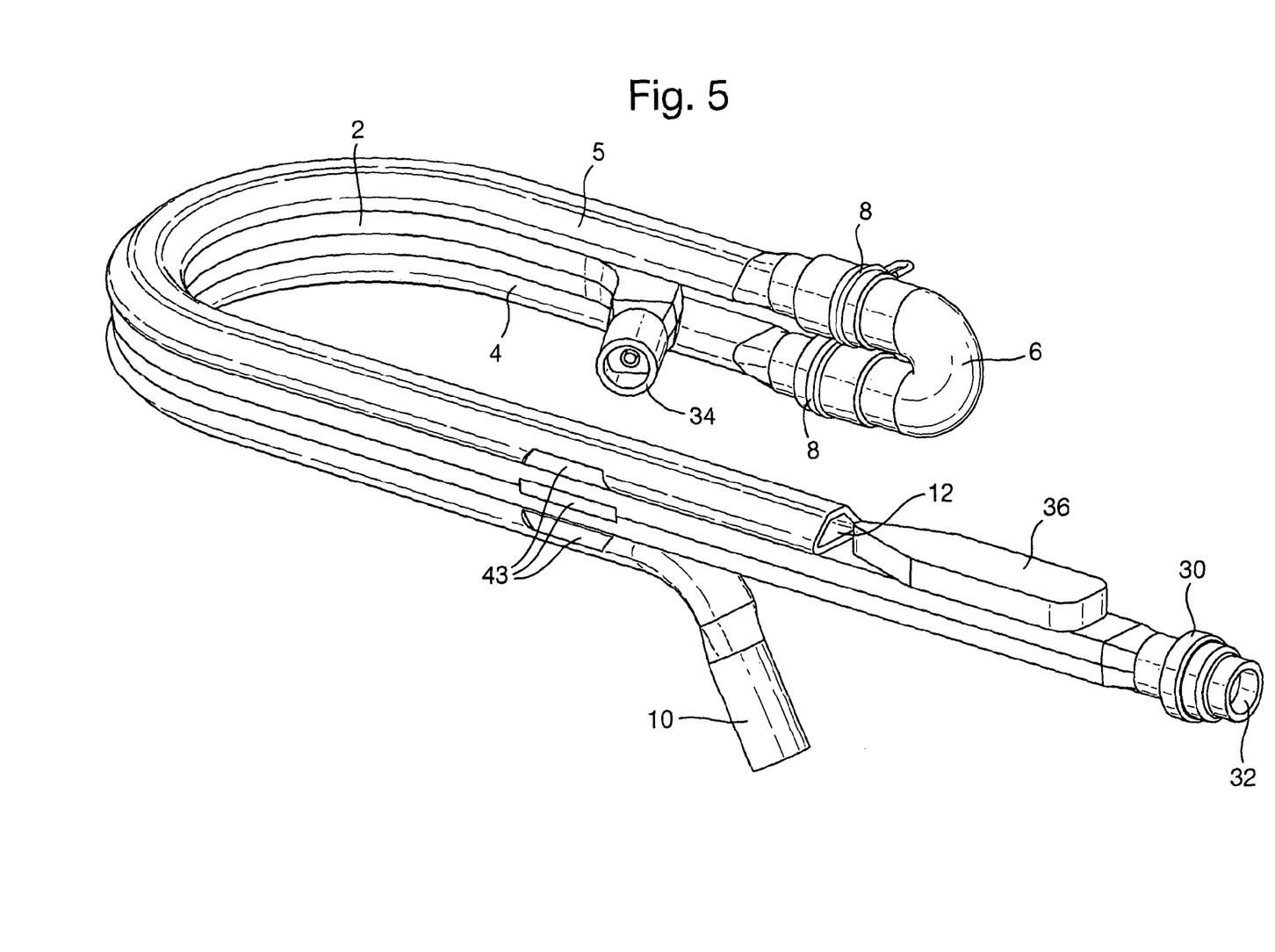
FIG. 5 shows the liquid flow channels and the heating element of the flow heater shown in FIGS. 1 and 2.

The outlet 12 of the upper channel 5 opens into the heating chamber 14 adjacent to a heat sink 36, e.g. an aluminum slug, which is bonded to the top of the portion of the heating element 2 in the heating chamber 14 (shown also in FIG. 5). The heat sink 36 acts as an additional thermal mass for the portion of the heating element 2 which extends into the heating chamber 14.

Figure 6:
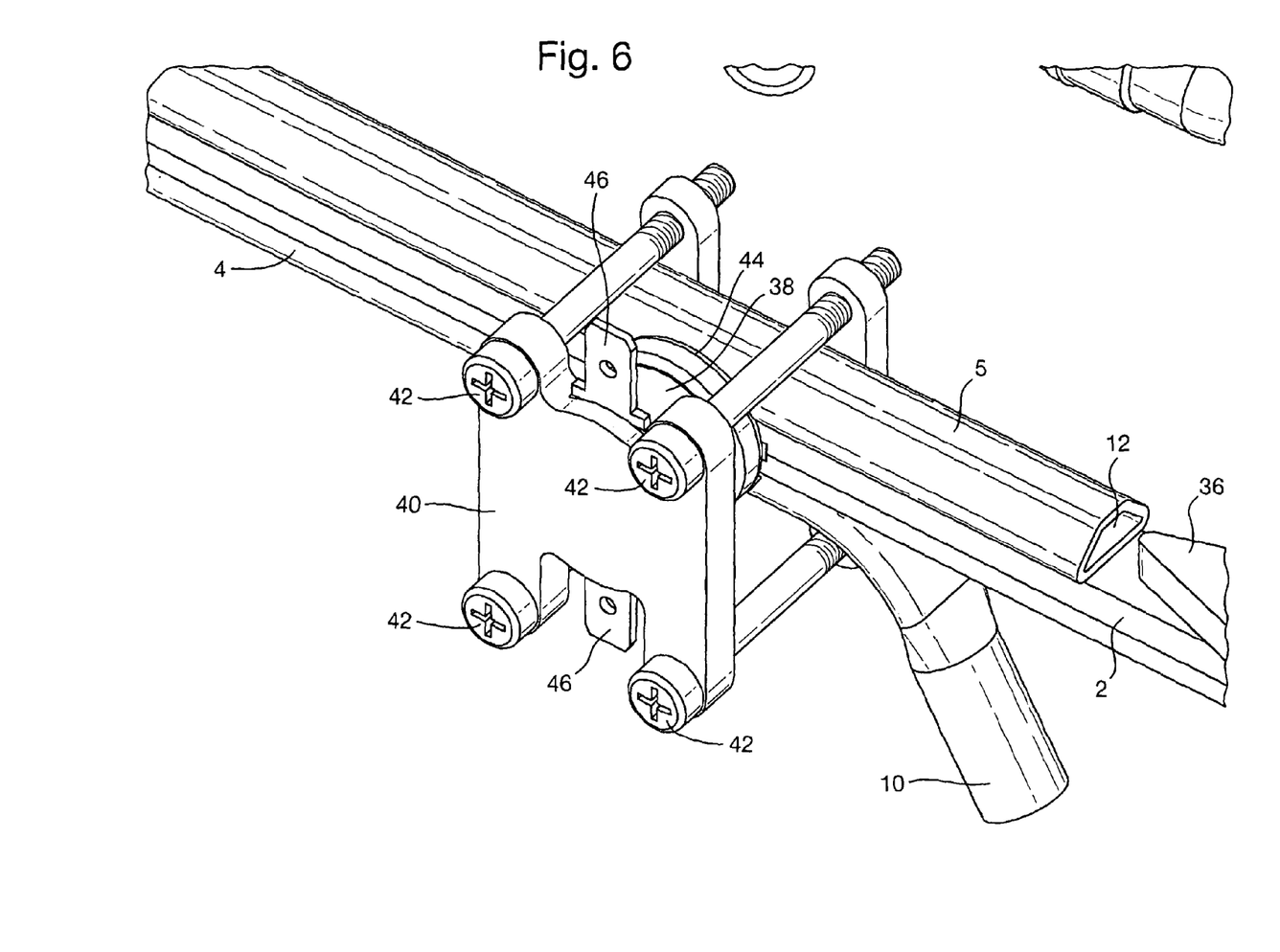
FIGS. 6 and 7 show close up views of the temperature sensor of the flow heater shown in FIGS. 1 and 2.
Figure 7:
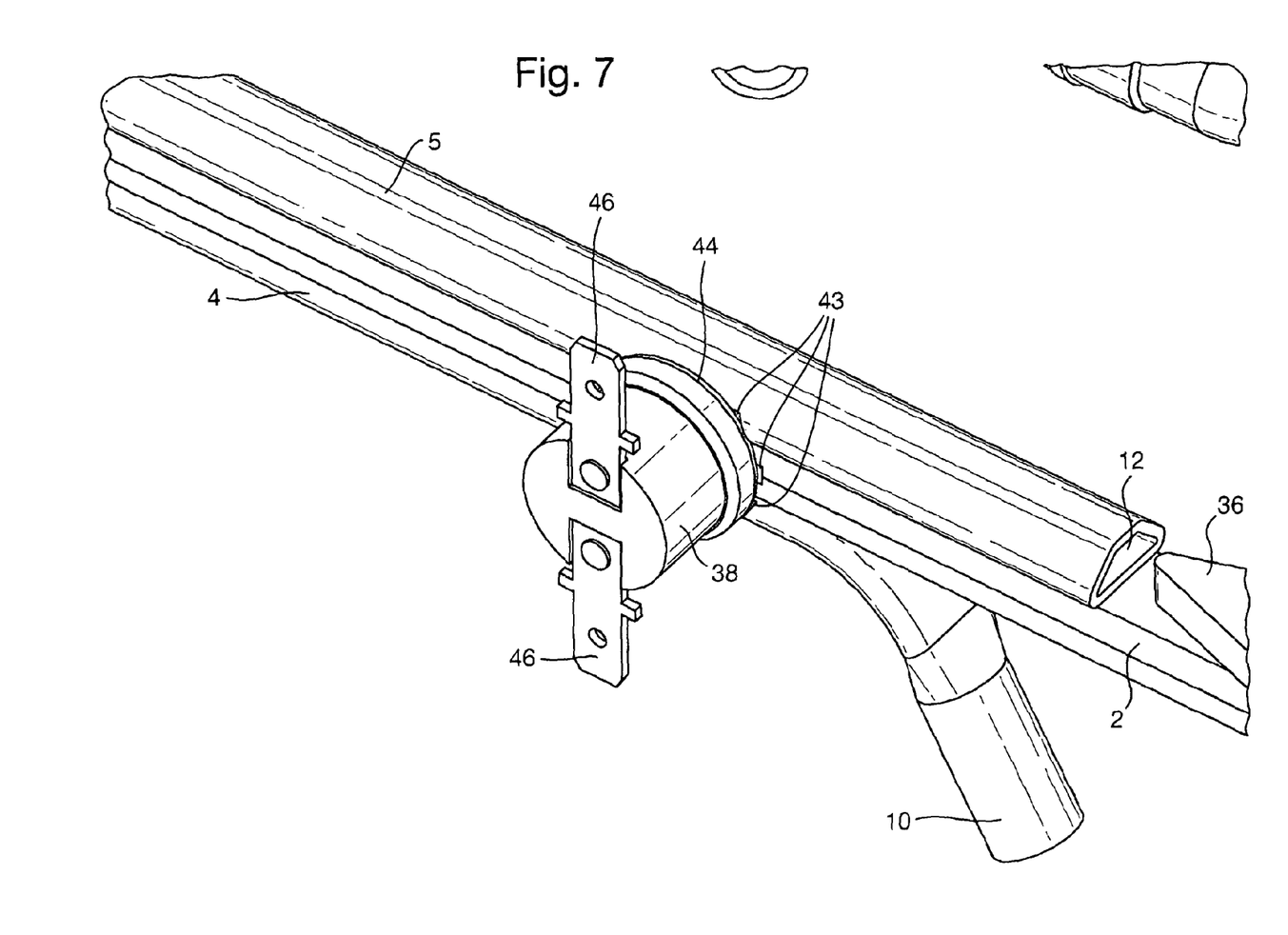

Turning now to FIGS. 6 and 7, it can be seen that a bimetallic disc thermostat 38, also known as a half-inch disc, is clamped to the side of the water flow channels 4, 5 and the heating element 2 by a bracket 40 and screws 42. As shown in FIG. 5, a flattened area 43 has been formed on the water flow channels 4, 5 and the heating element 2 to increase the contact area for the thermostat 38 on the flow heater. The thermostat 38 has two terminals 46 that are coupled to switch contacts within the thermostat 38 (not shown) and which are acted on by a bimetallic disc actuator (not shown) which is held in good thermal communication with the conducting face 44 of the thermostat 38. In use, the terminals 46 are connected to a control circuit which can then provide power to or remove power from the heating element 2.

Operation of the flow heater 1 will now be described with reference to the Figures.

When a user wishes to dispense water, he/she turns on the flow heater 1 to activate a control circuit (not shown). Initially this activates the heating element 2 by applying electrical power across the cold tails 32, 34 via connections (not shown) to the control circuit. After a delay of one or two seconds (depending on the temperature of the water already in the heater) a pump (not shown) is operated to pump water (from a reservoir or other source) to the upstream end of the lower water flow channel 4 through the inlet 10, from where it flows through the plastic connecting tube 6 and into the upper water flow channel 5. In other embodiments the pump may be started before the heating element 2, or both could be started at same time.

As the water flows through the channels 4, 5 it is heated by the element 2 until it emerges via outlet 12 into the heating chamber 14 at a temperature of approximately 85° C., where it begins to fill this chamber 14. The weir 23 of the hot water outlet 22 which projects upwards into the main body 20 of the heating chamber 14 causes the water level in the heating chamber 14 to rise, thereby covering the exposed portion of the element 2 which extends into the heating chamber 14. The exposed part of the heating element 2 continues to heat the water in the heating chamber 14, during which time localized boiling occurs at the element surface, giving rise to violent movement of the water and large bubbles of steam being generated. However, the steam can easily escape the heating chamber by means of the steam outlet 18 in the lid 16.

When water in the boil pool reaches the level of the top of the weir 23 of the hot water outlet 22 it can then freely flow down the tube and out of the spout of the appliance (not shown) into a user's receptacle. It will be seen therefore that the weir 23 of the outlet tube 22 which is inside the heating chamber 14 acts to maintain a minimum water level inside the heating chamber 14. Since this minimum water level is above the top of the heating element 2, it may be ensured that during normal operation the element 2 remains covered with water and cannot therefore overheat. The pumped flow rate and the power of the element 2 are matched such that by the time the water leaves the heating chamber 14 by spilling over the top of the hot water outlet 22 it is effectively boiling. This includes an 'over-allowance' of energy input as compared to the energy that would theoretically be required to raise the water temperature to 100° C. to ensure a rolling boil and thus that the water attains a true temperature very close to boiling. When the required volume of hot water has been dispensed, any remaining water in the heating chamber 14 drains out of the outlet tube 22 via the slit 25 in the weir 23.

In the event of the reservoir running out of water or the appliance being switched on without any water in, the temperature of the element 2 will rise very rapidly. This rapid temperature rise is communicated by means of the conducting face 44 of the thermostat 38 to the bimetallic actuator inside which causes it to operate thereby opening its respective switch contact and interrupting the power supply to the element 2. Thus dangerous overheating and/or damage is prevented. In the event of the element 2 overheating, the heat sink 36 bonded to the exposed portion of the heating element 2 in the heating chamber 14 acts as a heat sink so that this portion of the element 2 does not overheat irreparably.

Through repeated operation of the flow heater 1, especially in areas of hard water, limescale will gradually build up in the channels 4, 5. As has been explained previously, this acts to insulate the heating element 2 from the cooling effect of the water flowing through the channels 4, 5, causing the element 2 to operate at increasingly higher temperatures, though the effect is far more noticeable in the upper, hotter, channel 5. However, because the thermostat 38 is in direct contact with both of the channels 4, 5 and the heating element 2, when water flows through the channels 4, 5 during normal operation, even if there is a large amount of limescale present in the channels 4, 5, the average temperature experienced by the thermostat 38 is low enough not to activate the bimetallic actuator. Therefore the flow heater 1 can be operated for a large number of cycles before DBI occurs. Furthermore, the thermostat 38 will quickly sense the lack of water in the channels 4, 5 if the heating element 2 is energized, because the low mass aluminum channels 4, 5 will also quickly heat up, thereby reaching the activation temperature of the bimetallic actuator in the thermostat 38 within a safe time to protect the heating element 2, and the flow heater 1 in general, from damage. This creates a good balance between a long period of use before DBI and a quick switch off in the event of DSO in a high power heater, i.e. one which gives quick start up but is prone to the build up of limescale.

It will be appreciated by those skilled in the art that many variations and modifications to the embodiments described above may be made within the scope of the various aspects of the invention set out herein. For example, in accordance with the first aspect of the invention, it is not necessary to provide a final heating chamber; the arrangement of the thermostat shown could be provided for any type of flow heater.

What is claimed is:

1. A flow heater comprising a heating element, a channel heated by said heating element for heating liquid flowing therethrough, wherein the heating element is outside the channel and is mounted to or in contact with an outer wall of the channel and wherein the heating element and channel comprise a contact area bridging the heating element and the channel, the flow heater further comprising a temperature sensor arranged outside the channel in thermal communication with the contact area bridging both the heating element and the channel so as to be sensitive to the temperature of the liquid in the channel and the temperature of the heating element.

2. A flow heater as claimed in claim 1, wherein the temperature sensor is arranged to remove or reduce power to the heating element when the temperature sensor detects a predetermined temperature condition.

3. A flow heater as claimed in claim 1, wherein the temperature sensor comprises a bimetallic actuator.

4. A flow heater as claimed in claim 1, wherein the heating element comprises a sheathed resistance heating element.

5. A flow heater as claimed in claim 1, wherein the heating element has a power greater than 1 kW.

6. A flow heater as claimed in claim 1, wherein the channel comprises a first portion in fluid communication with a second portion, said first and second portions each being arranged to be heated by said heating element for heating liquid flowing therethrough, and wherein the first and second portions are arranged on different sides of the heating element.

7. A flow heater as claimed in claim 6, wherein the first and second portions of channel are arranged on opposite sides of the heating element.

8. A flow heater as claimed in claim 6, wherein the temperature sensor is in thermal communication with each of the heating element and the first and second portions of channel, the temperature sensor being sensitive to a temperature of liquid in both portions of the channel and a temperature of the heating element.

9. A flow heater as claimed in claim 1, wherein the channel is arranged to heat liquid flowing therethrough to a first temperature and the flow heater further comprises a final heating region arranged to heat said liquid therein to a second temperature higher than said first temperature and having a passage permitting exit of steam therefrom separately from heated liquid.

10. A flow heater as claimed in claim 9, wherein the final heating region is arranged to heat the liquid therein to boiling.

11. A flow heater as claimed in claim 9, wherein the heating element extends into the final heating region.

12. A flow heater as claimed in claim 9, wherein the region of the heating element which extends into the final heating region is in thermal communication with a heat sink.

13. A flow heater as claimed in claim 9, further comprising an arrangement permitting automatic outflow of liquid from the final heating region upon the liquid reaching a predetermined level.

14. A flow heater as claimed in claim 9, wherein the final heating region comprises a drainage outlet arranged to drain undispensed liquid out of the final heating region.

* * * * *

UNITED STATES PATENT AND TRADEMARK OFFICE
CERTIFICATE OF CORRECTION

PATENT NO. : 9,494,311 B2  Page 1 of 1
APPLICATION NO. : 14/239444
DATED : November 15, 2016
INVENTOR(S) : Moughton et al.

It is certified that error appears in the above-identified patent and that said Letters Patent is hereby corrected as shown below:

Specification

Column 2, line 8, please delete "timescale" and insert --limescale--.

Signed and Sealed this
Twenty-seventh Day of December, 2016

Michelle K. Lee
*Director of the United States Patent and Trademark Office*